United States Patent
Wang

(10) Patent No.: US 11,361,586 B2
(45) Date of Patent: Jun. 14, 2022

(54) METHOD FOR SENDING WARNING INFORMATION, STORAGE MEDIUM AND TERMINAL

(71) Applicant: Hangzhou Hikvision Digital Technology Co., Ltd., Zhejiang (CN)

(72) Inventor: Junsong Wang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 227 days.

(21) Appl. No.: 16/622,864

(22) PCT Filed: Jun. 13, 2018

(86) PCT No.: PCT/CN2018/091028
§ 371 (c)(1),
(2) Date: Dec. 13, 2019

(87) PCT Pub. No.: WO2018/228422
PCT Pub. Date: Dec. 20, 2018

(65) Prior Publication Data
US 2020/0201688 A1 Jun. 25, 2020

(30) Foreign Application Priority Data

Jun. 15, 2017 (CN) .......................... 201710454708.8

(51) Int. Cl.
*G06K 9/00* (2022.01)
*G06V 40/16* (2022.01)
(Continued)

(52) U.S. Cl.
CPC .............. *G06V 40/16* (2022.01); *G06F 17/18* (2013.01); *G06K 9/6215* (2013.01)

(58) Field of Classification Search
CPC ..... G06F 9/542; G06F 17/18; G06K 9/00221; G06K 9/6215; G06K 9/00771;
(Continued)

(56) References Cited

U.S. PATENT DOCUMENTS

| 9,477,876 | B2 | 10/2016 | Sukegawa et al. | |
| 2003/0039380 | A1* | 2/2003 | Sukegawa ........... | G06K 9/00288 382/118 |
| 2013/0195316 | A1* | 8/2013 | Bataller ............... | G06V 40/173 382/103 |

FOREIGN PATENT DOCUMENTS

| CN | 102622579 A | 8/2012 |
| CN | 103037157 A | 4/2013 |

(Continued)

OTHER PUBLICATIONS

Extended European search report of counterpart EP application No. 18817320.7 dated May 8, 2020.
(Continued)

*Primary Examiner* — Alex Kok S Liew
(74) *Attorney, Agent, or Firm* — Knobbe Martens Olson & Bear LLP

(57) ABSTRACT

A method for sending early warning information, a storage medium and a terminal are provided. The method includes: calculating a target similarity between a first face image and a target face image when the first face image captured by an imaging device is acquired; and generating and sending early warning information corresponding to the first face image if the target similarity reaches a similarity threshold at the current moment; wherein, the similarity threshold is determined by a fluctuation degree value of a plurality of similarities in a similarity sample, the similarity in the similarity sample is a target similarity corresponding to a
(Continued)

generated warning information, and the similarity sample is updated over. As a result, the accuracy in early warning may be improved.

20 Claims, 4 Drawing Sheets

(51) Int. Cl.
  *G06F 17/18* (2006.01)
  *G06K 9/62* (2022.01)
(58) Field of Classification Search
  CPC ........... G06K 9/00288; G06K 9/00255; G06K 9/00295; G06K 9/6211; G06K 9/00; G06K 9/00228; G06K 9/00268; G06K 9/00261; G06K 9/38; G06K 9/00275; G06K 9/00208; G06K 9/00281; G06K 9/6218; G06K 9/622; G06K 9/6255; G06K 9/00899; G06K 9/00979; G06K 9/036; G06K 9/6201; G06K 9/6234; G07C 9/37; G07C 9/38; G07C 1/20; G07C 2011/02; G07C 2209/10; G07C 3/00; G07C 9/00
  See application file for complete search history.

(56) References Cited

FOREIGN PATENT DOCUMENTS

| CN | 103093209 A | 5/2013 |
|---|---|---|
| CN | 105468955 A | 4/2016 |
| CN | 105488478 A | 4/2016 |
| CN | 106022032 A | 10/2016 |
| EP | 2091021 A1 | 8/2009 |
| EP | 3076320 A1 | 10/2016 |

OTHER PUBLICATIONS

International search report of PCT application No. PCT/CN2018/091028 dated Sep. 11, 2018.
First office action of Chinese application No. 201710454708.8 dated Aug. 20, 2019.

* cited by examiner

METHOD FOR SENDING WARNING INFORMATION, STORAGE MEDIUM AND TERMINAL

The present application is a national phase of PCT patent application No.: PCT/CN2018/091028 filed on Jun. 13, 2018, which claims priority to Chinese Patent Application No. 201710454708.8, filed with the China National Intellectual Property Administration on Jun. 15, 2017 and entitled "METHOD, DEVICE AND SYSTEM FOR ISSUING WARNING INFORMATION", the entire contents of which are incorporated herein by reference.

TECHNICAL FIELD

The present disclosure relates a method for sending early warning information, a storage medium and a terminal.

BACKGROUND

In a security scene based on face recognition, in order to find a certain human target, face images captured by imaging devices at all traffic locations (e.g., a subway station and an airport) may be compared with a pre-stored face image of the human target to determine where the human target is.

SUMMARY

The present disclosure provides a method, a device and a system for sending early warning information, a storage medium and a terminal. The technical solutions are described as below.

According to a first aspect of embodiments of the present disclosure, a method for sending early warning information is provided. The method includes:

acquiring similarities corresponding to generated early warning information;

determining, based on a fluctuation degree value of the similarity corresponding to the generated early warning information, a similarity threshold corresponding to a current scenario;

calculating, based on a preset face recognition algorithm, a target similarity between a first face image and a pre-stored target face image whenever the first face image captured by an imaging device is acquired; and sending early warning information corresponding to the first face image if the target similarity reaches the calculated similarity threshold corresponding to the current scenario.

Optionally, the determining, based on a fluctuation degree value of the similarity corresponding to the generated early warning information, a similarity threshold corresponding to a current scenario includes:

calculating a fluctuation degree value of the similarity corresponding to the generated early warning information; and determining a mean value of the similarity corresponding to the generated early warning information as the similarity threshold corresponding to the current scenario if the fluctuation degree value is greater than a first preset fluctuation threshold.

Optionally, the method further includes:

determining a down-regulation value, and determining a difference value between a previously determined similarity threshold and the down-regulation value as the similarity threshold corresponding to the current scenario if the fluctuation degree value is less than a second preset fluctuation threshold and the quantity of the generated early warning information is less than a first preset quantity threshold.

Optionally, the method further includes:

determining a previously determined similarity threshold as the similarity threshold corresponding to the current scenario if the fluctuation degree value is less than or equal to a first preset fluctuation threshold, and greater than or equal to a second preset fluctuation threshold.

Optionally, the acquiring similarities corresponding to generated early warning information includes:

cyclically acquiring, according to a preset acquisition cycle, a similarity corresponding to early warning information generated within a previous acquisition cycle.

Optimally, the acquiring similarities corresponding to generated early warning information includes:

acquiring similarities corresponding to generated early warning information whenever the quantity of the generated early warning information reaches a second preset quantity threshold.

Optionally, the method further includes:

determining target early warning information to be deleted when it is detected that an early warning information deletion trigger event occurs; and deleting the determined target early warning information.

Optionally, the determining target early warning information to be deleted when it is detected that an early warning information deletion trigger event occurs includes:

determining early warning information generated at time from which to the current time a duration is greater than a preset duration threshold as the target warning information to be deleted when it is detected that current time is preset deletion time; or determining a preset quantity of early warning information generated at time from which to the current time a duration is maximal as the target warning information to be deleted when it is detected that current time is preset deletion time.

According to a second aspect of embodiments of the present disclosure, a device for sending early warning information is provided. The device includes:

an acquiring module, configured to acquire similarities corresponding to generated early warning information;

a determining module, configured to determine, based on a fluctuation degree value of the similarity corresponding to the generated early warning information, a similarity threshold corresponding to a current scenario;

a calculating module, configured to calculate, based on a preset face recognition algorithm, a target similarity between a first face image and a pre-stored target face image whenever the first face image captured by an imaging device is acquired; and a sending module, configured to send early warning information corresponding to the first face image if the target similarity reaches the calculated similarity threshold corresponding to the current scenario.

Optionally, the determining module is configured to:

calculate a fluctuation degree value of the similarity corresponding to the generated early warning information; and determine a mean value of the similarity corresponding to the generated early warning information as the similarity threshold corresponding to the current scenario if the fluctuation degree value is greater than a first preset fluctuation threshold.

Optionally, the determining module is further configured to:

determine a down-regulation value, and determine a difference value between a previously determined similarity threshold and the down-regulation value as the similarity threshold corresponding to the current scenario if the fluctuation degree value is less than a second preset fluctuation threshold and the quantity of the generated early warning information is less than a first preset quantity threshold.

Optionally, the determining module is further configured to:

determine a previously determined similarity threshold as the similarity threshold corresponding to the current scenario if the fluctuation degree value is less than or equal to a first preset fluctuation threshold, and greater than or equal to a second preset fluctuation threshold.

Optionally, the acquiring module is configured to:

cyclically acquire, according to a preset acquisition cycle, a similarity corresponding to early warning information generated within a previous acquisition cycle.

Optionally, the acquiring module is configured to:

acquire similarities corresponding to generated early warning information whenever the quantity of the generated early warning information reaches a second preset quantity threshold.

Optionally, the determining module is further configured to:

determine target early warning information to be deleted when it is detected that an early warning information deletion trigger event occurs; and delete the determined target early warning information.

Optionally, the determining module is configured to:

determine early warning information generated at time from which to the current time a duration is greater than a preset duration threshold as the target warning information to be deleted when it is detected that current time is preset deletion time; or determine a preset quantity of early warning information generated at time from which to the current time a duration is maximal as the target warning information to be deleted when it is detected that current time is preset deletion time.

According to a third aspect of embodiments of the present disclosure, a computer-readable storage medium is provided. A computer program is stored in the storage medium, and the steps of the method as defined in the first aspect are implemented when the computer program is executed by a processor.

According to a fourth aspect of embodiments of the present disclosure, a system for sending early warning information is provided. The system includes the device as defined in the second aspect, and an imaging device.

According to a fifth aspect of embodiments of the present disclosure a terminal is provided. The terminal includes:

one or a plurality of processors; and a memory; wherein one or a plurality of programs are stored in the memory, wherein the one or plurality of programs are configured to be executed by the processor, and include at least one instruction for performing the steps in the method as defined in the first aspect.

The technical solutions according to the embodiments of the present disclosure may achieve the following beneficial effects:

In the embodiments of the present disclosure, the terminal may acquire the similarity corresponding to the early warning information generated before, and determine, based on the fluctuation degree value of the similarity corresponding to the early warning information, the similarity threshold corresponding to the current scenario. Further, when the target similarity between the first face image captured by the imaging device and the target face image is calculated, the target similarity may be compared with the determined similarity threshold corresponding to the current scenario. If the target similarity reaches the similarity threshold corresponding to the current scenario, the early warning information corresponding to the first face image is sent. When the captured face image is unclear, the calculated fluctuation degree value of the similarity between the captured face image and the target face image is generally relatively large. In this case, the similarity threshold that adapts to the current scenario may be obtained by increasing the similarity threshold. Thus, each time the terminal obtains the target similarity, the obtained target similarity is compared with the similarity threshold that adapts to the current scenario but not with the preset similarity threshold. Further, the quantity of early warning information sent by a misjudgment may be reduced. Hence, the accuracy in early warning may be improved.

It is to be understood that both the foregoing general description and the following detailed description are exemplary and explanatory only and are not intended to limit the present disclosure.

DETAILED DESCRIPTION

Reference is now made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

In a security scene based on face recognition, imaging devices at all the traffic locations may capture face images. A terminal may continuously acquire the face images captured by the imaging devices. Further, a similarity between the face images captured by the imaging devices and the pre-stored face image of the human target may be calculated based on a preset face recognition algorithm. If the similarity is greater than a preset similarity threshold, early warning information (for example, early warning information capable of displaying the face images captured by the imaging devices and the calculated similarity) is sent. A worker who sees the early warning information may reconfirm whether the face images captured by the imaging devices are the human target. If yes, it may be determined that the human target appears at the location where the imaging devices are.

In practice, the following problems exist in the above related arts.

The face images captured by the imaging devices on some scenarios may be unclear (for example, the face images captured in fog are unclear). On these scenarios, if the calculated similarity is still compared with the preset similarity threshold, it may lead to a misjudgment (that is, when the captured face image is not the human target, it may be mistaken as the human target). Further, the early warning information that is sent includes a large number of early warning information incurred by the misjudgment. As a result, the accuracy in early warning is relatively low.

Related to the above problems, one exemplary embodiment of the present disclosure provides a method for sending early warning information. The method may be applied to a terminal, which may be a personal computer and may perform data communication with a front-end apparatus (an imaging device). A processor, a memory and a transceiver may be disposed in the terminal. The processor may be configured for related processing to obtain early warning information. The memory may be configured to store data required and generated during the processing. The transceiver may be configured to receive and send data. A display may also be disposed and configured to display the early warning information.

Figure 1:
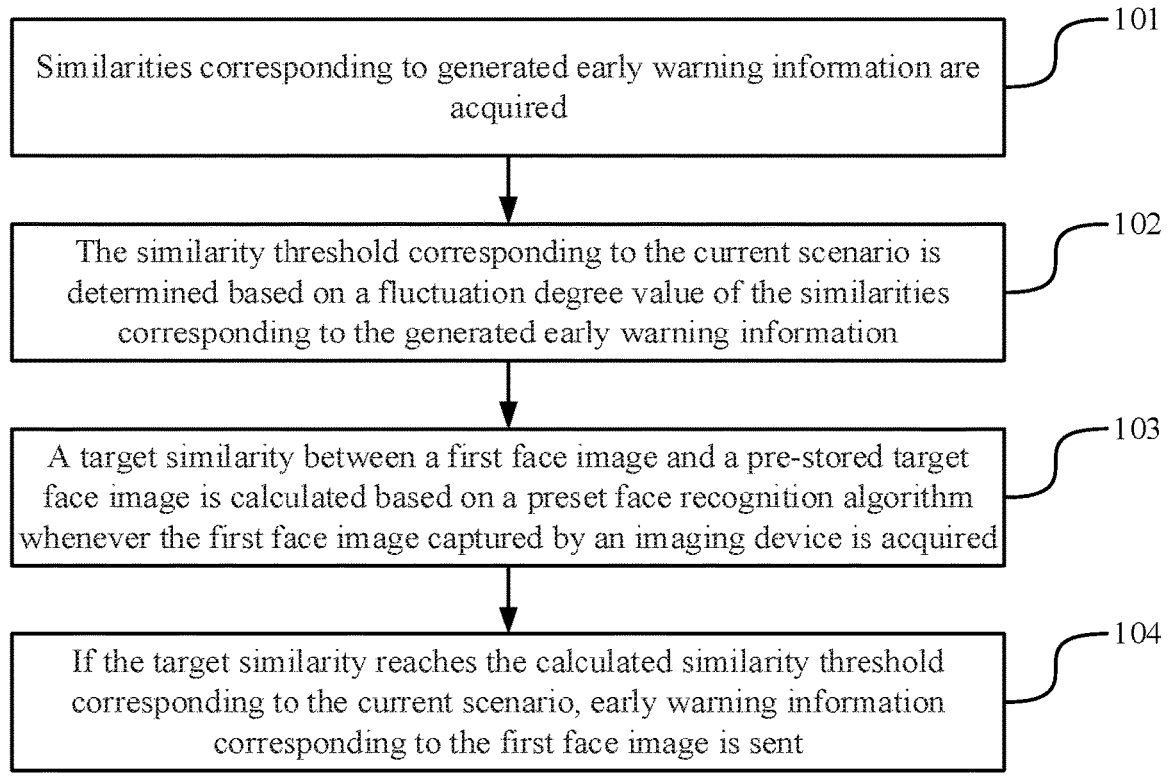
FIG. 1 is a flowchart of a method for sending early warning information in accordance with an exemplary embodiment.

The processing flow shown in FIG. 1 is illustrated below in detail with reference to the following embodiments.

In step 101, similarities corresponding to generated early warning information are acquired.

In one optional embodiment, the terminal may have a face early warning function and pre-store an initial similarity threshold. In order to determine the position of a human target, when the face early warning function is started, the terminal may acquire, in real time, a face image captured by an imaging device that performs data communication with the terminal. The terminal may calculate, based on a preset face recognition algorithm, a similarity between each acquired face image and a pre-stored target face image of the human target. Further, a relationship between the calculated similarity and the initial similarity threshold may be determined. If the calculated similarity is greater than or equal to the initial similarity threshold, the terminal may generate and send early warning information corresponding to the face image, which may include the face image, the similarity and the target face image and may further include the position of the imaging device that captures the face image. That is, in an initial phase, each time the similarity is calculated, it may be compared with the initial similarity threshold.

The target face image may be a face image stored in a server, the terminal or the imaging device, e.g., a face photo of a child of a registered user or an identification photo of the lost elderly.

In operation, the terminal may adaptively adjust a similarity threshold corresponding to a current scenario based on scenario changes. In particular, a calculation trigger event of the similarity threshold may be set in the terminal. When the face early warning function is started, the similarities corresponding to the generated early warning information may be acquired whenever it is detected that the calculation trigger event of the similarity threshold occurs.

Optionally, based on the different calculation trigger events of the similarity threshold, there may be various processing modes of step 101. Several processing modes are given as below.

In mode 1, similarities corresponding to early warning information generated within a previous acquisition cycle is cyclically acquired according to a preset acquisition cycle.

In one optional embodiment, an acquisition cycle may be preset in the terminal. At this time, the preset acquisition cycle may serve as the calculation trigger event of the similarity threshold. That is, when the face early warning function is started, the terminal may cyclically acquire, according to a preset acquisition cycle, the similarities corresponding to the early warning information generated within the previous acquisition cycle. For example, if the terminal receives an instruction of starting the face early warning function at 9:00 and the cycle is one hour, the terminal may acquire, at 10:00, the similarities of the early warning information generated from 9:00 to 10:00, and the terminal may acquire, at 11:00, the similarities of the early warning information generated from 10:00 to 11:00, and so forth.

In mode 2, similarities corresponding to generated early warning information are acquired when the quantity of the generated early warning information reaches a second preset quantity threshold.

In one optional embodiment, a quantity threshold (namely, the second preset quantity threshold) may be pre-stored in the terminal. In this case, the terminal may acquire the similarities corresponding to the early warning information generated at this time whenever the quantity of the generated early warning information reaches the second preset quantity threshold. For example, if the second preset quantity threshold is 20, after receiving the instruction of starting the face early warning information, the terminal may acquire the similarities corresponding to the generated 20 early warning information when the quantity of the generated early warning information reaches 20. At this time, the quantity of the generated early warning information may be re-counted. When the quantity of early warning information generated later reaches 20 again, the terminal may acquire the similarities corresponding to the 20 early warning information generated at this time.

In mode 3, each time the similarity threshold is calculated, timing is started and the quantity of the generated early warning information is calculated. When the timing period reaches a preset duration or the quantity reaches the second preset quantity threshold, the similarities corresponding to the generated early warning information is acquired.

In one optional embodiment, each time the similarity threshold is calculated, timing may be re-started and the quantity of the generated early warning information is re-counted. The specific process in which the similarity threshold is calculated is illustrated in detail hereinafter. When the timing period reaches the preset duration or the quantity reaches the second preset quantity threshold, the similarities corresponding to the generated early warning information is acquired. That is, the terminal may acquire the similarities of the generated early warning information so long as one of the above conditions is met.

In step 102, the similarity threshold corresponding to the current scenario is determined based on a fluctuation degree value of the similarities corresponding to the generated early warning information.

In one optional embodiment, after acquiring the similarities corresponding to the generated early warning information, the terminal may determine the fluctuation degree value of the similarities corresponding to the generated early warning information, and may further adjust the similarity threshold based on the determined fluctuation degree value. The adjusted similarity threshold is determined as the similarity threshold corresponding to the current scenario.

Optionally, the similarity threshold may be determined by the following steps: calculating the fluctuation degree value of the similarities corresponding to the generated early warning information; and if the fluctuation degree value is greater than a first preset fluctuation threshold, determining a mean value of the similarities corresponding to the generated early warning information as the similarity threshold corresponding to the current scenario.

In one optional embodiment, after acquiring the similarities corresponding to the generated early warning information, the terminal may calculate the fluctuation degree value of the similarities based on a preset computational formula of the fluctuation degree value. The fluctuation degree value may be a variance or a standard deviation of the similarities corresponding to the generated early warning information. For example, when the four acquired similarities corresponding to the early warning information are a, b, c and d, the terminal may calculate the variance or the standard deviation of a, b, c and d based on a computational formula of the variance or the standard deviation. After obtaining the fluctuation degree value, the terminal may compare the obtained fluctuation degree value with the first preset fluctuation threshold. If the fluctuation degree value of the acquired similarities is greater than the first preset fluctuation threshold (this shows that the face image captured on the current scenario is relatively low in resolution, and as a result, when the captured face image is not the human target, it may be mistaken as the human target), the terminal may calculate the mean value of the similarities corresponding to the generated early warning information, and further, may determine the calculated mean value as the similarity threshold corresponding to the current scenario. That is, when the fluctuation degree value of the similarities corresponding to the generated early warning information is relatively large, the similarity threshold corresponding to the current scenario may be increased appropriately, such that the terminal may reduce the quantity of the early warning information generated later. Further, the pressure in manual confirmation of the early warning information may be reduced for a worker. For example, if the previous similarity threshold is 70 and the similarities corresponding to the acquired early warning information are respectively, 71, 75, 80 and 78, the terminal may determine the mean value 76 of 71, 75, 80 and 78 as the similarity threshold corresponding to the current scenario.

Optionally, the terminal may also appropriately reduce the similarity threshold used later by the following steps when the similarity threshold is relatively high: if the fluctuation degree value is less than a second preset fluctuation threshold and the quantity of the generated early warning information is less than a first preset quantity threshold, determining a down-regulation value, and determining a difference value between a previously determined similarity threshold and the down-regulation value as the similarity threshold corresponding to the current scenario.

In one optional embodiment, after obtaining the fluctuation degree value, the terminal may also compare the obtained fluctuation degree value with the second preset fluctuation threshold. If the fluctuation degree value is less than the second preset fluctuation threshold, the terminal may further compare the acquired quantity of the generated early warning information with the first preset quantity threshold. If the quantity of the generated early warning information is less than the first preset quantity threshold, the terminal may appropriately reduce the original similarity threshold.

Optionally, if the fluctuation degree value is less than the second preset fluctuation threshold and the quantity of the generated early warning information is less than the first preset quantity threshold, the terminal may determine the difference value between the previously determined similarity threshold and the down-regulation value as the similarity threshold corresponding to the current scenario after determining the down-regulation value of this down-regulation. The down-regulation value may be a preset value and may also be determined based on the previously determined similarity threshold. For the latter, the terminal may determine half of a difference value between an upper limit value of the similarities and the previously determined similarity threshold as the down-regulation value. For example, if the previously determined similarity threshold is 80 and the upper limit value is 100, the terminal may determine half (10) of the difference value of 100 and 80 as the down-regulation value. In this way, if the quantity of the generated early warning information is relatively small, the similarity threshold may be reduced appropriately, such that the terminal may generate an appropriate quantity of early warning information. Moreover, the possibility in finding the human target is increased.

Optionally, the terminal may not change the previously determined similarity threshold when the similarity threshold is within a preset range. Correspondingly, the processing is as below: if the fluctuation degree value is less than or equal to the first preset fluctuation threshold, and greater than or equal to the second preset fluctuation threshold, the previously determined similarity threshold is determined as the similarity threshold corresponding to the current scenario.

In one optional embodiment, after the calculated similarity threshold is compared with the first preset fluctuation threshold and the second preset fluctuation threshold, if the fluctuation degree value is between the second preset fluctuation threshold and the first preset fluctuation threshold, the terminal may acquire the previously determined similarity threshold and determine it as the similarity threshold corresponding to the current scenario. That is, in this case, the previously determined similarity threshold may not be changed and may be continuously used later.

In step 103, a target similarity between a first face image and a pre-stored target face image is calculated based on a preset face recognition algorithm whenever the first face image captured by an imaging device is acquired.

Figure 2:
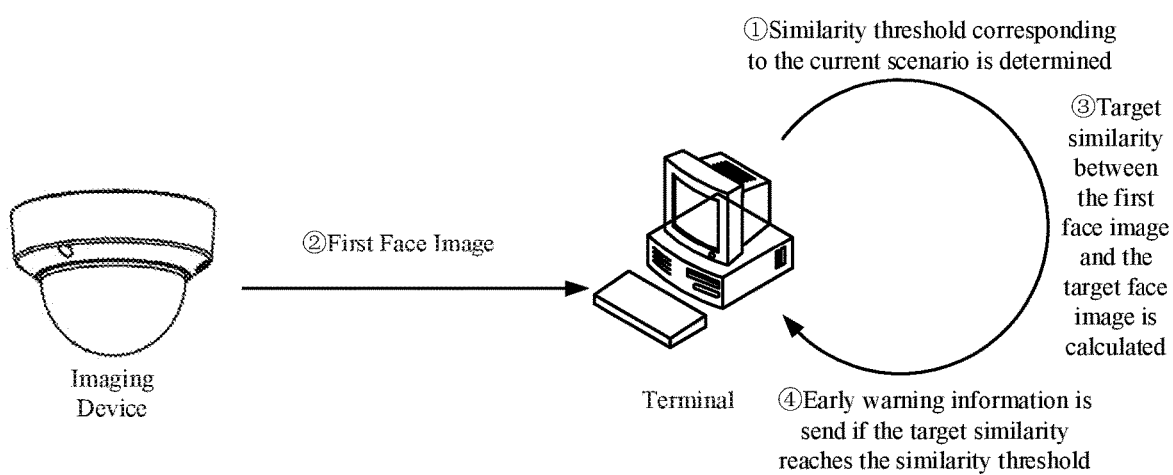
FIG. 2 is a schematic view of a system framework in accordance with an exemplary embodiment.

In one optional embodiment, the terminal may perform data communication with the front-end apparatus (the imaging device). Each time the imaging device captures the face image (it may also be called the first face image), the captured face image may be sent to the terminal, as shown in FIG. 2. After receiving the first face image, the terminal may calculate, based on the preset face recognition algorithm, the similarity (namely, the target similarity) of the first face image to the pre-stored target face image. The target face image may be the face image of the human target.

In addition, each time the terminal determines the similarity threshold corresponding to the current scenario, the determined similarity threshold may be sent to the imaging device. Correspondingly, after receiving the similarity threshold corresponding to the current scenario, the imaging device may store it and generate task data, based on a preset format, by the first face image and the received similarity threshold whenever the imaging device captures the first face image. For example, task data including the first face image and the similarity threshold is generated in the form of a table. The task data may further include such information as the position and an identifier of the imaging device. The task data may be sent to the terminal after being generated. Correspondingly, after receiving the task data, the terminal may acquire the first face image and calculate the target similarity between the first face image and the pre-stored target face image.

In step 104, if the target similarity reaches the calculated similarity threshold corresponding to the current scenario, early warning information corresponding to the first face image is sent.

In one optional embodiment, after the target similarity is calculated, the terminal compares the target similarity with the determined similarity threshold corresponding to the current scenario. If the target similarity reaches the determined similarity threshold corresponding to the current scenario, the terminal may generate and send early warning information corresponding to the first face image. The terminal may display the early warning information corresponding to the first face image or send an alarm while displaying the early warning information corresponding to the first face image.

When communicating with the imaging devices in a plurality of locations, namely, acquiring face images captured by the imaging devices in a plurality of locations, the terminal may determine a subsequently-used similarity threshold corresponding to each location respectively. That is, for each location, the terminal may perform processing based on the method described in steps 101 to 104. In particular, for each location, the similarity corresponding to the generated early warning information is acquired, the similarity threshold corresponding to the current scenario of this location is determined based on the fluctuation degree value of the similarities corresponding to the generated early warning information; the target similarity between the first face image and the pre-stored target face image is calculated based on the preset face recognition algorithm whenever the first face image captured by the imaging device is acquired; and if the target similarity reaches the calculated similarity threshold corresponding to the current scenario, the early warning information corresponding to the first face image is sent.

Optionally, the terminal may also delete the generated early warning information by the following steps: when it is detected an early warning information deletion trigger event occurs, determining target early warning information to be deleted; and deleting the determined target early warning information.

In one optional embodiment, a deletion mechanism for the generated early warning information may be preset in the terminal. In particular, the early warning information deletion trigger event may be preset in the terminal. The terminal may determine early warning information to be deleted this time (it may also be called target early warning information) in the currently stored early warning information whenever it is detected the early warning information deletion trigger event occurs. After determining the target early warning information, the terminal may delete it, such that the terminal may have a sufficient storage space for storing the early warning information generated later.

Optionally, there may be various different methods for determining the target early warning information. Several feasible processing modes are provided as below.

In mode 1, when it is detected that current time is preset deletion time, early warning information generated at time from which to the current time a duration is greater than a preset duration threshold is determined as the target warning information to be deleted.

In one optional embodiment, each time the early warning information is generated, the terminal may correspondingly record time at which each early warning information is generated. In addition, deletion time may be preset in the terminal. When it is detected that current time is the preset deletion time, the terminal may determine a duration from the time at which each early warning information is generated to the current time in all the currently stored early warning information. Further, the terminal may compare each duration with a preset duration threshold, and determine early warning information generated at time from which to the current time a duration is greater than the preset duration threshold as the target warning information to be deleted.

In mode 2, when it is detected that current time is preset deletion time, a preset quantity of early warning information generated at time from which to the current time a duration is maximal is determined as the target warning information to be deleted.

In one optional embodiment, each time the early warning information is generated, the terminal may correspondingly record time at which each piece of early warning information is generated. In addition, deletion time may be preset in the terminal. When it is detected that current time is the preset deletion time, the terminal may determine a duration from the time at which each early warning information is generated to the current time in all the currently stored early warning information. Further, the terminal may rank the early warning information in the order of the duration from large to small. After obtaining the ranked early warning information, the terminal may select a preset quantity of early warning information from front to back. Further, the selected preset quantity of early warning information may be determined as the target early warning information to be deleted.

In the present embodiment, the terminal may acquire the similarities corresponding to the early warning information generated before, and determine, based on the fluctuation degree value of the similarities corresponding to the early warning information, the similarity threshold corresponding to the current scenario. Further, when the target similarity between the first face image captured by the imaging device and the target face image is calculated, the target similarity may be compared with the similarity threshold corresponding to the current scenario. If the target similarity reaches the similarity threshold corresponding to the current scenario, the early warning information corresponding to the first face image is sent. When the captured face image is unclear, the calculated fluctuation degree value of the similarities between the captured face image and the target face image is generally relatively large. In this case, the similarity threshold that adapts to the current scenario may be obtained by increasing the similarity threshold. Thus, each time the terminal obtains the target similarity, the obtained target similarity is compared with the similarity threshold that adapts to the current scenario but not with the preset similarity threshold. Further, the quantity of early warning information sent due to a misjudgment may be reduced. Hence, the accuracy in early warning may be improved.

Figure 3:
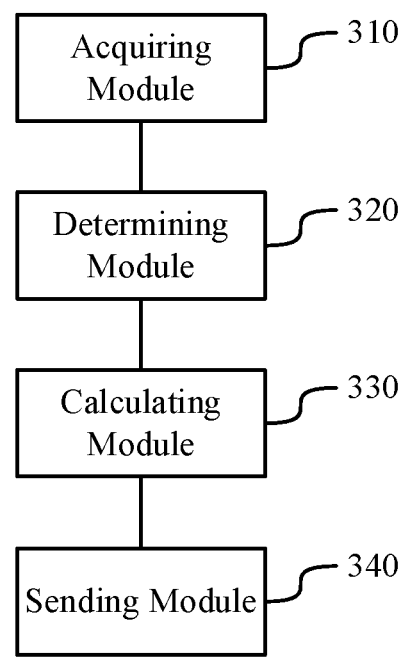
FIG. 3 is a schematic view of a device for sending early warning information in accordance with an exemplary embodiment.

Another exemplary embodiment of the present disclosure provides a device for sending early warning information. As shown in FIG. 3, the device includes:

an acquiring module 310, configured to acquire similarities corresponding to generated early warning information;

a determining module 320, configured to determine, based on a fluctuation degree value of the similarities corresponding to the generated early warning information, a similarity threshold corresponding to a current scenario;

a calculating module 330, configured to calculate, based on a preset face recognition algorithm, a target similarity between a first face image and a pre-stored target face image whenever the first face image captured by an imaging device is acquired; and a sending module 340, configured to send early warning information corresponding to the first face image, if the target similarity reaches the calculated similarity threshold corresponding to the current scenario.

Optionally, the determining module 320 is configured to:

calculate a fluctuation degree value of the similarities corresponding to the generated early warning information; and determine a mean value of the similarities corresponding to the generated early warning information as the similarity threshold corresponding to the current scenario if the fluctuation degree value is greater than a first preset fluctuation threshold.

Optionally, the determining module 320 is further configured to:

determine a down-regulation value, and determine a difference value between a previously determined similarity threshold and the down-regulation value as the similarity threshold corresponding to the current scenario if the fluctuation degree value is less than a second preset fluctuation threshold and the quantity of the generated early warning information is less than a first preset quantity threshold.

Optionally, the determining module 320 is further configured to:

determine a previously determined similarity threshold as the similarity threshold of the current scenario if the fluctuation degree value is less than or equal to a first preset fluctuation threshold, and greater than or equal to a second preset fluctuation threshold.

Optionally, the acquiring module 310 is configured to:

cyclically acquire, according to a preset acquisition cycle, similarities corresponding to early warning information generated within a previous acquisition cycle.

Optionally, the acquiring module 310 is configured to:

acquire similarities corresponding to generated early warning information whenever the quantity of the generated early warning information reaches a second preset quantity threshold.

Optionally, the determining module 320 is further configured to:

determine target early warning information to be deleted when it is detected an early warning information deletion trigger event occurs; and delete the determined target early warning information.

Optionally, the determining module 320 is configured to:

determine early warning information generated at time from which to the current time a duration is greater than a preset duration threshold as the target warning information to be deleted when it is detected that current time is preset deletion time; or determine a preset quantity of early warning information generated at time from which to the current time a duration is maximal as the target warning information to be deleted when it is detected that current time is preset deletion time.

With regard to the device in the above embodiment, the specific manners in which the respective modules perform the operations are described in detail in the method-related embodiment, and thus is not explained in detail herein.

In the present embodiment, the terminal may acquire the similarities corresponding to the early warning information generated before, and determine, based on the fluctuation degree value of the similarities corresponding to the early warning information, the similarity threshold corresponding to the current scenario. Further, when the target similarity between the first face image captured by the imaging device and the target face image is calculated, the target similarity may be compared with the similarity threshold corresponding to the current scenario. If the target similarity reaches the similarity threshold corresponding to the current scenario, the early warning information corresponding to the first face image is sent. When the captured face image is unclear, the calculated fluctuation degree value of the similarities between the captured face image and the target face image is generally relatively large. In this case, the similarity threshold that adapts to the current scenario may be obtained by increasing the similarity threshold. Thus, each time the terminal obtains the target similarity, the obtained target similarity is compared with the similarity threshold that adapts to the current scenario but not with the preset similarity threshold. Further, the quantity of early warning information sent due to a misjudgment may be reduced. Hence, the accuracy in early warning may be improved.

It should be noted that the device for sending the early warning information only takes division of the above functional modules as examples for explanation when the early warning information is sent. In practice, the above-described functions may be distributed as required to the different functional modules for completion. That is, the internal structure of the terminal is divided into different functional modules to complete all or part of the functions described above. In addition, the device for sending the early warning information and the method for sending the early warning information belong to the same concept. Thus, for specific implementation of the device, reference may be made to the method-related embodiment, which is not repeated herein.

Figure 4:
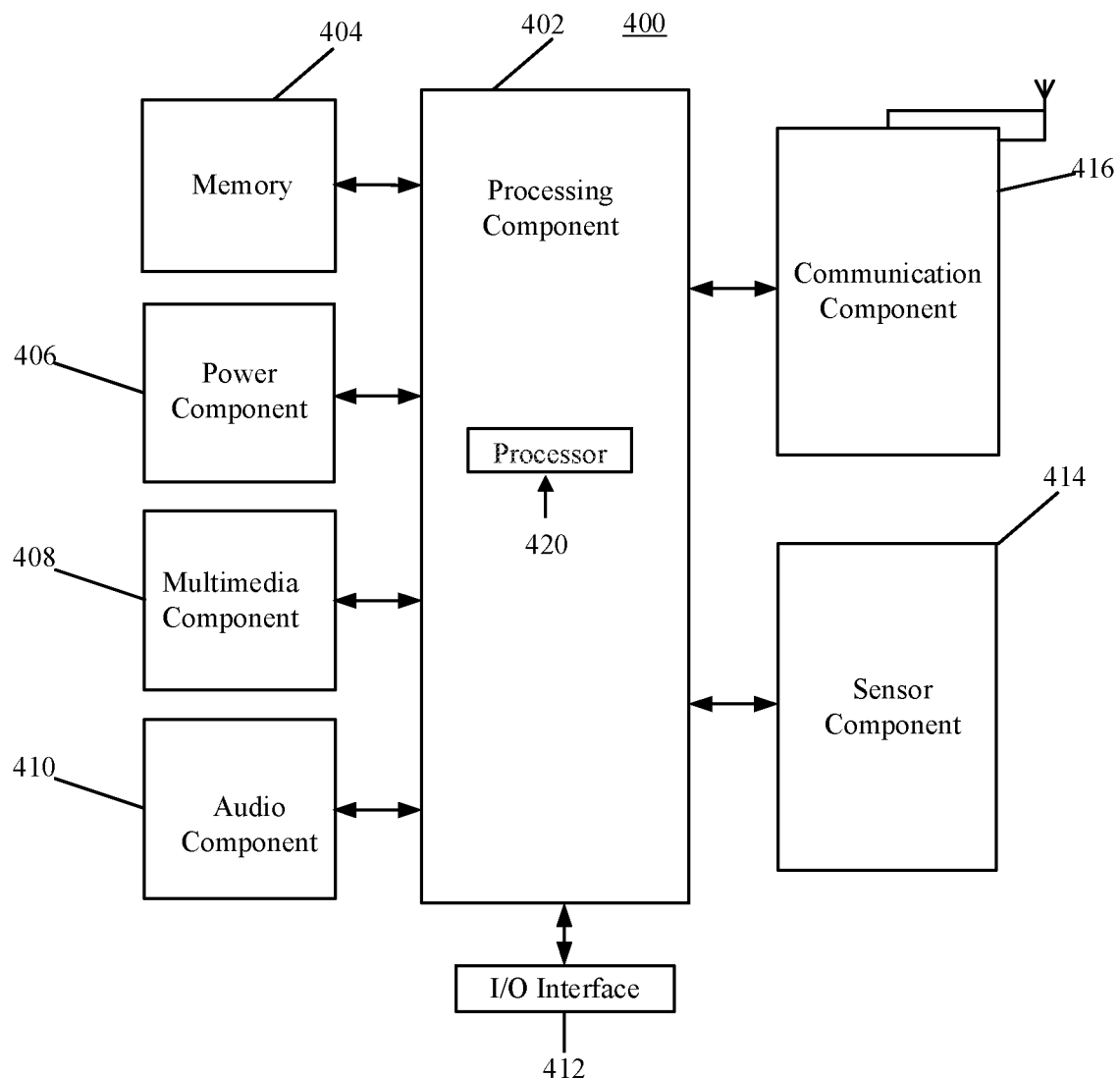
FIG. 4 is a schematic structural view of a terminal in accordance with an exemplary embodiment.

Yet another exemplary embodiment of the present disclosure illustrates a schematic structural view of a terminal. Referring to FIG. 4, a terminal 400 may include one or a plurality of components as follows: a processing component 402, a memory 404, a power component 406, a multimedia component 408, an audio component 410, an input/output (I/O) interface 412, a sensor component 414 and a communication component 416.

The processing component 402 typically controls the overall operations of the apparatus 400, such as the operations associated with display, telephone calls, data communications, imaging device operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, videos, etc. The memory 404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 408 includes a front camera and/or a rear camera. The front camera and the rear camera may receive external multimedia data while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive external audio signals when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker for outputting audio signals.

The I/O interface 412 provides an interface between the processing component 402 and peripheral interface modules, such as a keyboard, a click wheel, buttons, and the like. The buttons may include, but are not limited to, a home button, a volume button, a start button, and a lock button.

The sensor component 414 includes one or more sensors to provide status assessments of various aspects of the apparatus 400. For instance, the sensor component 414 may detect an on/off status of the apparatus 400, relative positioning of components, e.g., the display device and the mini keyboard of the apparatus 400, and the sensor component 414 may also detect a position change of the apparatus 400 or a component of the apparatus 400, presence or absence of user contact with the apparatus 400, orientation or acceleration/deceleration of the apparatus 400, and temperature change of the apparatus 400. The sensor component 414 may include a proximity sensor configured to detect the presence of nearby objects without any physical contact. The sensor component 414 may also include a light sensor, such as a CMOS or CCD image sensor, used for imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 may access a wireless network based on a communication standard, such as WiFi, 2G, or 3G, or a combination thereof. In an exemplary embodiment, the communication component 416 receives broadcast signals or broadcast associated information from an external broadcast management system via a broadcast channel. In an exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 404 including instructions, executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

The instruction in the non-temporary computer-readable storage medium is executed by the processor to implement a method for sending early warning information. The method includes:

acquiring similarities corresponding to generated early warning information;

determining, based on a fluctuation degree value of the similarities corresponding to the generated early warning information, a similarity threshold corresponding to a current scenario;

calculating, based on a preset face recognition algorithm, a target similarity between a first face image and a pre-stored target face image whenever the first face image captured by an imaging device is acquired; and sending early warning information corresponding to the first face image if the target similarity reaches the calculated similarity threshold corresponding to the current scenario.

Optionally, the instruction in the storage medium may also be executed by the processor to:

calculate a fluctuation degree value of the similarities corresponding to the generated early warning information; and determine a mean value of the similarities corresponding to the generated early warning information as the similarity threshold corresponding to the current scenario if the fluctuation degree value is greater than a first preset fluctuation threshold.

Optionally, the instruction in the storage medium may also be executed by the processor to:

determine a down-regulation value, and determine a difference value between a previously determined similarity threshold and the down-regulation value as the similarity threshold corresponding to the current scenario if the fluctuation degree value is less than a second preset fluctuation threshold and the quantity of the generated early warning information is less than a first preset quantity threshold.

Optionally, the instruction in the storage medium may also be executed by the processor to:

determine a previously determined similarity threshold as the similarity threshold corresponding to the current scenario if the fluctuation degree value is less than or equal to a first preset fluctuation threshold, and greater than or equal to a second preset fluctuation threshold.

Optionally, the instruction in the storage medium may also be executed by the processor to:

cyclically acquire, according to a preset acquisition cycle, similarities corresponding to early warning information generated within a previous acquisition cycle.

Optionally, the instruction in the storage medium may also be executed by the processor to:

acquire similarities corresponding to generated early warning information whenever the quantity of the generated early warning information reaches a second preset quantity threshold.

Optionally, the instruction in the storage medium may also be executed by the processor to:

determine target early warning information to be deleted when it is detected that an early warning information deletion trigger event occurs; and delete the determined target early warning information.

Optionally, the instruction in the storage medium may also be executed by the processor to:

determine early warning information generated at time from which to the current time a duration is greater than a preset duration threshold as the target warning information to be deleted when it is detected that current time is preset deletion time; or determine a preset quantity of early warning information generated at time from which to the current time a duration is maximal as the target warning information to be deleted when it is detected that current time is preset deletion time.

Figure 5:
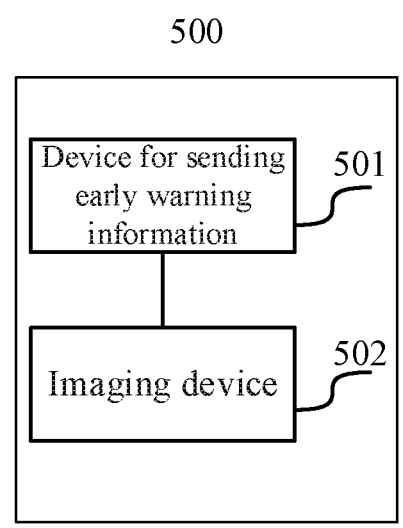
FIG. 5 is a schematic view of a system for sending early warning information in accordance with an exemplary embodiment.

As shown in FIG. 5, the present disclosure provides a system 500 for sending early warning information. The system 500 includes a device 501 for sending early warning information as provided by the foregoing embodiment, and an imaging device 502.

In the embodiments of the present disclosure, the terminal may acquire the similarities corresponding to the early warning information generated before, and determine, based on the fluctuation degree value of the similarities corresponding to the early warning information, the similarity threshold corresponding to the current scenario. Further, when the target similarity between the first face image captured by the imaging device and the target face image is calculated, the target similarity may be compared with the similarity threshold corresponding to the current scenario. If the target similarity reaches the similarity threshold corresponding to the current scenario, the early warning information corresponding to the first face image is sent. When the captured face image is unclear, the calculated fluctuation degree value of the similarities between the captured face image and the target face image is generally relatively large. In this case, the similarity threshold that adapts to the current scenario may be obtained by increasing the similarity threshold. Thus, each time the terminal obtains the target similarity, the obtained target similarity is compared with the similarity threshold that adapts to the current scenario but not with the preset similarity threshold. Further, the quantity of early warning information sent due to a misjudgment may be reduced. Hence, the accuracy in early warning may be improved.

Other embodiments of the present disclosure may be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It may be appreciated that the present disclosure is not limited to the exact construction that has been described above and illustrated in the accompanying drawings, and that various modifications and changes may be made without departing from the scope thereof. It is intended that the scope of the present disclosure is only limited by the appended claims.

What is claimed is:

1. A method for sending early warning information, comprising:

calculating a target similarity between a first face image and a target face image when the first face image captured by an imaging device is acquired; and generating and sending early warning information corresponding to the first face image if the target similarity reaches a similarity threshold at the current moment;

wherein, the similarity threshold is determined by a fluctuation degree value of a plurality of similarities in a similarity sample, the similarity in the similarity sample is a target similarity corresponding to a generated warning information, and the similarity sample is updated over time, so that the similarity threshold changes with generation of warning information and update of the similarity sample.

2. The method according to claim 1, wherein the similarity threshold is a mean value of the plurality of similarities in the similarity sample if the fluctuation degree value of the plurality of similarities in the similarity sample is greater than a first fluctuation threshold.

3. The method according to claim 1, wherein an updated similarity threshold is a difference value between the similarity threshold to be updated and a down-regulation value if the fluctuation degree value of the plurality of similarities in the similarity sample is less than a second fluctuation threshold and the quantity of similarities in the similarity sample is less than a first quantity threshold.

4. The method according to claim 1, wherein an updated similarity threshold is maintained at the similarity threshold to be updated if the fluctuation degree value of the plurality of similarities in the similarity sample is less than or equal to a first fluctuation threshold and greater than or equal to a second fluctuation threshold, and the first fluctuation threshold is greater than the second fluctuation threshold.

5. The method according to claim 1, whenever an acquisition cycle is passed, the similarity sample is updated to a set of target similarities corresponding to early warning information generated within a previous acquisition cycle.

6. The method according to claim 1, wherein whenever a quantity of the newly generated early warning information reaches a second quantity threshold, the similarity sample is updated to a set of target similarities corresponding to the newly generated early warning information.

7. The method according to claim 1, further comprising:

determining target early warning information to be deleted when it is detected that an early warning information deletion trigger event occurs; and deleting the determined target early warning information.

8. The method according to claim 7, wherein determining target early warning information to be deleted when it is detected that an early warning information deletion trigger event occurs comprises:

determining any one of early warning information corresponding to a generating moment from which to the current moment a duration is greater than a preset duration threshold and early warning information corresponding to a generating moment from which to the current moment a duration is maximal as the target warning information to be deleted when it is detected that current moment is a deletion moment.

9. A non-transitory computer-readable storage medium, wherein a computer program is stored in the storage medium, a method is implemented when the computer program is executed by a processor, and the method comprises:

calculating a target similarity between a first face image and a target face image when the first face image captured by an imaging device is acquired; and generating and sending early warning information corresponding to the first face image if the target similarity reaches a similarity threshold at the current moment;

wherein, the similarity threshold is determined by a fluctuation degree value of a plurality of similarities in a similarity sample, the similarity in the similarity sample is a target similarity corresponding to a generated warning information, and the similarity sample is updated over time, so that the similarity threshold changes with generation of warning information and update of the similarity sample.

10. A terminal, comprising:
at least one processor; and
a memory; wherein
at least one program is stored in the memory and configured to be executed by the at least one processor and comprises instructions for implementing:

calculating a target similarity between a first face image and a target face image when the first face image captured by an imaging device is acquired; and generating and sending early warning information corresponding to the first face image if the target similarity reaches a similarity threshold at the current moment;

wherein, the similarity threshold is determined by a fluctuation degree value of a plurality of similarities in a similarity sample, the similarity in the similarity sample is a target similarity corresponding to a generated warning information, and the similarity sample is updated over time, so that the similarity threshold changes with generation of warning information and update of the similarity sample.

11. The storage medium according to claim 9, wherein the similarity threshold is a mean value of the plurality of similarities in the similarity sample if the fluctuation degree value of the plurality of similarities in the similarity sample is greater than a first fluctuation threshold.

12. The storage medium according to claim 9, wherein an updated similarity threshold is a difference value between the similarity threshold to be updated and a down-regulation value if the fluctuation degree value of the plurality of similarities in the similarity sample is less than a second fluctuation threshold and the quantity of similarities in the similarity sample is less than a first quantity threshold.

13. The storage medium according to claim 9, wherein an updated similarity threshold is maintained at the similarity threshold to be updated if the fluctuation degree value of the plurality of similarities in the similarity sample is less than or equal to a first fluctuation threshold and greater than or equal to a second fluctuation threshold, and the first fluctuation threshold is greater than the second fluctuation threshold.

14. The storage medium according to claim 9, whenever an acquisition cycle is passed, the similarity sample is updated to a set of target similarities corresponding to early warning information generated within a previous acquisition cycle.

15. The storage medium according to claim 9, wherein whenever a quantity of the newly generated early warning information reaches a second quantity threshold, the similarity sample is updated to a set of target similarities corresponding to the newly generated early warning information.

16. The terminal according to claim 10, wherein
the similarity threshold is a mean value of the plurality of similarities in the similarity sample if the fluctuation degree value of the plurality of similarities in the similarity sample is greater than a first fluctuation threshold.

17. The terminal according to claim 10, wherein
an updated similarity threshold is a difference value between the similarity threshold to be updated and a down-regulation value if the fluctuation degree value of the plurality of similarities in the similarity sample is less than a second fluctuation threshold and the quantity of similarities in the similarity sample is less than a first quantity threshold.

18. The terminal according to claim 10, wherein
an updated similarity threshold is maintained at the similarity threshold to be updated if the fluctuation degree value of the plurality of similarities in the similarity sample is less than or equal to a first fluctuation threshold and greater than or equal to a second fluctuation threshold, and the first fluctuation threshold is greater than the second fluctuation threshold.

19. The terminal according to claim 10, whenever an acquisition cycle is passed, the similarity sample is updated to a set of target similarities corresponding to early warning information generated within a previous acquisition cycle.

20. The terminal according to claim 10, wherein whenever a quantity of the newly generated early warning information reaches a second quantity threshold, the similarity sample is updated to a set of target similarities corresponding to the newly generated early warning information.

* * * * *